United States Patent
Schelch et al.

(10) Patent No.: US 10,626,027 B2
(45) Date of Patent: Apr. 21, 2020

(54) ELECTRODE

(71) Applicant: PRO AQUA DIAMANTELEKTRODEN PRODUKTION GMBH & CO KG, Niklasdorf (AT)

(72) Inventors: Michael Schelch, Oberaich (AT); Wolfgang Staber, Bruck an der Mur (AT); Robert Hermann, Oberaich (AT); Wolfgang Wesner, Vienna (AT)

(73) Assignee: PRO AQUA DIAMANTELEKTRODEN PRODUKTION GMBH & CO KG, Niklasdorf (AT)

( * ) Notice: Subject to any disclaimer, the term of this patent is extended or adjusted under 35 U.S.C. 154(b) by 123 days.

(21) Appl. No.: 15/575,354

(22) PCT Filed: May 10, 2016

(86) PCT No.: PCT/EP2016/060372
§ 371 (c)(1),
(2) Date: Nov. 18, 2017

(87) PCT Pub. No.: WO2016/184714
PCT Pub. Date: Nov. 24, 2016

(65) Prior Publication Data
US 2018/0148357 A1    May 31, 2018

(30) Foreign Application Priority Data

May 18, 2015 (AT) ................. A 50404/2015

(51) Int. Cl.
*C02F 1/461* (2006.01)
*C25B 11/04* (2006.01)
(Continued)

(52) U.S. Cl.
CPC ........ *C02F 1/46109* (2013.01); *C02F 1/4672* (2013.01); *C25B 11/04* (2013.01); *C25B 11/12* (2013.01); *C02F 2001/46133* (2013.01)

(58) Field of Classification Search
None
See application file for complete search history.

(56) References Cited

U.S. PATENT DOCUMENTS 4,377,565 A * 3/1983 Setaka .................. B01J 3/08
                                                    423/446
5,087,434 A * 2/1992 Frenklach ............ C30B 25/105
                                                    423/446
(Continued)

FOREIGN PATENT DOCUMENTS

AT     413 109 B    11/2005
EP   2 589 684 A1    5/2013
(Continued)

*Primary Examiner* — Harry D Wilkins, III
(74) *Attorney, Agent, or Firm* — Maschoff Brennan

(57) ABSTRACT

An electrode formed of synthetically produced, electrically conductive, doped diamond particles embedded in a carrier layer formed of electrically non-conductive material, wherein the diamond particles protrude on both sides of the carrier layer and come from a grain size range of 170 μm to 420 μm, wherein the diamond particles in the electrode have grain sizes which differ from one another by at most 50 μm. At most 10% of the diamond particles have a grain size outside the particular grain size range.

17 Claims, 1 Drawing Sheet

Figure 1:
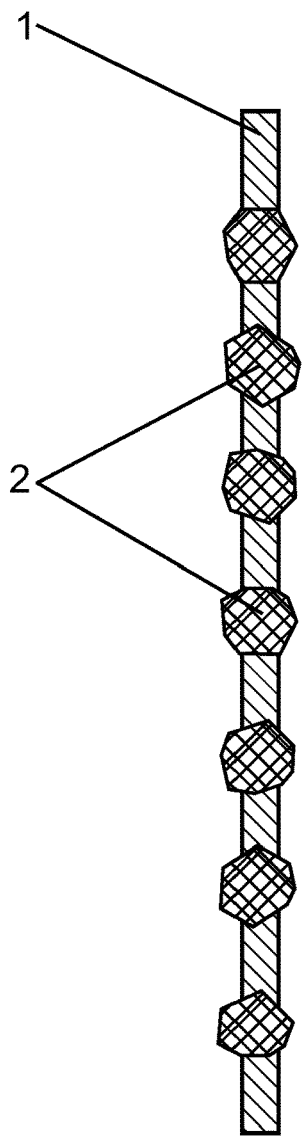

(51) Int. Cl.
*C02F 1/467* (2006.01)
*C25B 11/12* (2006.01)

(56) References Cited

U.S. PATENT DOCUMENTS

| | | | | |
|---|---|---|---|---|
| 5,266,236 A | * | 11/1993 | Bovenkerk | B01J 3/062 |
| | | | | 252/503 |
| 2004/0011643 A1 | * | 1/2004 | Davies | C12Q 1/001 |
| | | | | 204/294 |
| 2006/0151803 A1 | * | 7/2006 | Wesner | C02F 1/46109 |
| | | | | 257/103 |
| 2009/0324810 A1 | | 12/2009 | Serikawa et al. | |
| 2010/0170783 A1 | | 7/2010 | Wesner et al. | |
| 2013/0112548 A1 | | 5/2013 | Hermann et al. | |

FOREIGN PATENT DOCUMENTS

| | | |
|---|---|---|
| EP | 2 631 335 A2 | 8/2013 |
| WO | 03/066930 A1 | 8/2003 |
| WO | 20070102444 A1 | 9/2007 |
| WO | 20070116004 A2 | 10/2007 |

\* cited by examiner

ELECTRODE

The invention relates to an electrode formed of synthetically produced, electrically conductive, doped diamond particles embedded in a carrier layer formed of electrically non-conductive material, wherein the diamond particles protrude on both sides of the carrier layer and come from a grain size range of 170 µm to 420 µm, wherein the diamond particles in the electrode have grain sizes which differ from one another by at most 50 µm.

An electrode of this kind, which is also referred to as a diamond particle electrode, is known, for example, from WO 2007/116004 A2. Document EP 2 631 335 A2 discloses a plurality of methods for producing a diamond particle electrode of this kind.

Diamond particle electrodes are characterised by a high overvoltage for oxygen and hydrogen and are therefore particularly well suited for multiple oxidation processes in aqueous solution. Particularly advantageous uses of electrolysis cells that contain diamond particle electrodes lie in the field of water treatment by anodic oxidation and in the field of synthesis chemistry.

The freely protruding parts of the diamond particles should be as large as possible, adjusted to the thickness of the particular carrier layer, so as to provide highly effective electrodes. Here, the carrier layer must have a certain thickness in order to provide the electrode with good stability.

The object of the invention is, therefore, to improve the quality of an electrode of the aforementioned type by optimising the proportion of the parts of the diamond particles protruding from the carrier layer.

The stated object is achieved according to the invention in that at most 10% of the diamond particles have a grain size outside the particular grain size range.

Electrodes according to the invention therefore have a high proportion of protruding parts of the diamond particles on both sides, since the grain sizes deviate only slightly from one another. A high efficacy of the electrode can be ensured in this way.

In a preferred embodiment of the invention, the electrode comprises diamond particles of which the grain sizes differ from one another by at most 40 µm. For optimal efficacy of the electrode, an embodiment in which the diamond particles have grain sizes that differ from one another by at most 30 µm is also particularly advantageous.

In the case of particularly high-quality electrodes, at most 5%, preferably even at most 3% of the diamond particles have a larger and/or a smaller grain size. According to a further feature of the invention, the average grain size of the diamond particles is adjusted to the thickness of the carrier layer in such a way that the ratio of the thickness of the carrier layer to the average grain size of the diamond particles is 1:3 to 1:8.

In accordance with a further preferred embodiment it is particularly advantageous, for a particularly good efficacy of the electrode, if, on both sides of the carrier layer, the proportion of free surface not occupied by diamond particles is at most 50%.

Further features, advantages and details of the invention will now be described in greater detail with reference to the schematic drawing, which depicts an exemplary embodiment. In the drawing FIG. 1 shows a sectional representation of a portion of an electrode, and FIG. 2 shows a sectional view during the production of the electrode.

The invention relates to an electrode for an electrochemical cell (electrolysis cell). As shown in FIG. 1, the electrode consists of doped, and therefore electrically conductive diamond particles 2, which are embedded in a single layer and without contact with one another in a carrier layer 1 made of plastic. The diamond particles 2 are, in particular, industrial diamonds produced in a high-pressure/high-temperature process, preferably doped with boron, and are therefore single crystals. The diamond particles 2 can also be doped with nitrogen, phosphorus, arsenic, antimony, niobium, lithium, sulfur or oxygen.

The electrode can be produced in accordance with one of the methods known from EP 2 631 335 A2, wherein one of these methods will be described in summary hereinafter with reference to FIG. 2. The carrier layer 1 shown in FIG. 1 is produced from two films 4, 5 formed of chemically stable polymers, for example formed of polytetrafluoroethylene (Teflon), polyvinylidene fluoride (PVDF) or perfluoroalkoxyalkane (PVA), fluorinated ethylene propylene (FEP), ethylene tetrafluoroethylene (ETFE), ethylene ChloroTriFluoroEthylene (ECTFE), polychlorotrifluoroethylene (PCTFE), polyether ether ketone (PEEK), polyethylene (PE), polypropylene (PP), polyvinyl chloride (PVC) or polyphenylene sulfide (PPS). Two films 4, 5 made of the same material and having the same or different thickness of 12.5 µm to 250 µm, in particular 25 µm to 100 µm, depending on the size of the diamond particles 2, are each laid onto a thin auxiliary layer 3 formed of a soft, flexible material. The thickness of the auxiliary layers 3 is between 0.5 mm and 3 mm. For example, polytetrafluoroethylene (Teflon), Viton or Kapton (fluoroelastomers from the company Dupont), Neoprene or silicone are potential materials for the auxiliary layers 3. The auxiliary layers 3, similarly to the films 4, 5, are supplied and used in the form of roll goods or in sheet form.

Figure 2:
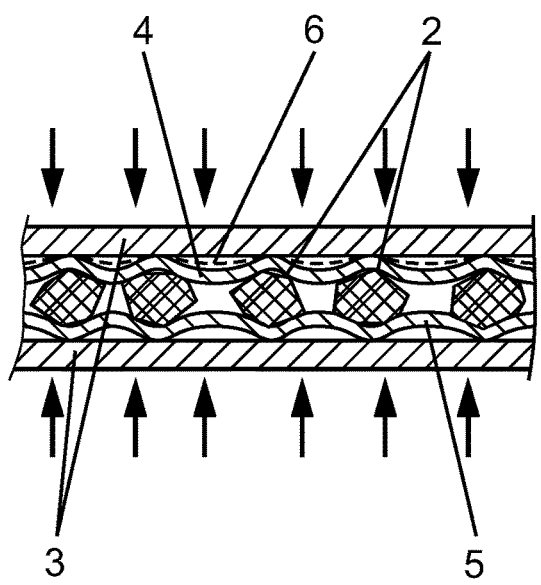

FIG. 2 shows the structure during the production of the electrode with two films 4, 5, the diamond particles 2 disposed therebetween, and the auxiliary layers 3 disposed on the outer sides of each of the films 4, 5. The layers joined together in accordance with FIG. 2 are then exposed to pressure and heat, for example in a double-belt press of conventional design. The arrows in FIG. 2 show the direction of the pressure acting from outside in the double-belt press. The films 4, 5 melt under the action of pressure and heat and are fixedly connected to one another. The diamond particles 2 thereby penetrate the auxiliary layers on both sides of the melt, which layers consequently enclose each particle, whereby the surface of said particle cannot be wetted by molten material and is thus partially exposed at the outer sides of the film material. The material composite leaving the double-belt press is optionally cooled, and the auxiliary layers 3 are removed. The material composite can now be cut to form electrodes of desired size.

As shown in FIG. 2, in order to increase the mechanical strength of the produced electrodes, a support layer 6 can be introduced in one or more layers between at least one of the films 4, 5 and the corresponding auxiliary layer 3, which support layer is produced as a support mesh or support fabric or the like. The particles 2 also penetrate the support mesh or support fabric 6 during the pressing process. Alternatively it is possible to apply a support mesh or support fabric 6 to an outer side of the electrode already produced, or to both outer sides, for example by lamination or adhesive bonding. Plastics, such as polytetrafluoroethylene (Teflon), polyvinylidene fluoride (PVDF), perfluoroalkoxyalkane (PFA), fluorinated ethylene propylene (FEP), ethylene tetrafluoroethylene (ETFE), polyether ether ketone (PEEK) or polyphenylene sulfide (PPS), glass fibres, plastic-coated glass fibres, ceramics or metals are suitable as material for the support mesh or the support fabric 6. In this embodiment, the finished electrode contains at least one support layer which stabilises it and can be made comparatively thin, in particular from thinner films 4, 5.

The material for the support layer(s) 6 is adjusted to the material of the films 4, 5 in respect of the melting point, so that the support layer(s) 6 does/do not melt when the films 4, 5 melt.

The diamond particles 2 are selected from certain grain size ranges in order to ensure that the freely protruding portions of the diamond particles 2 are as large as possible according to the particular thickness of the carrier layer 1. If this range is selected such that it is too great, the proportion of diamond particles 2 that are too small, and which possibly even remain completely covered by the carrier layer and are ineffective, is relatively large. Electrodes according to the invention are produced with diamond particles 2 having grain sizes between 170 µm and 420 µm. In order to produce a certain electrode, diamond particles 2 are used that have grain sizes of which the size difference is ≤50 µm, preferably ≤40 µm and particularly preferably ≤30 µm. At most 10%, in particular at most 5% of the diamond particles 2 can have grain sizes outside the particular range. In the finished electrode, the free surface of the carrier layer 1, that is to say the surface not occupied by the parts of the diamond particles protruding therefrom, should be at most 50% of the total surface of the carrier layer 1, on both sides. Furthermore, the ratio of the thickness of the carrier layer to the average grain size of the diamond particles 2 used for an electrode should be between 1:3 and 1:8. The grain sizes of the diamond particles 2 are determined in a manner known per se by sieving with use of sieves of different fineness or by means of particle analysers.

LIST OF REFERENCE SIGNS

1 . . . Carrier layer
2 . . . Diamond particle
3 . . . Auxiliary layer
4, 5 . . . Film
6 . . . Support layer

The invention claimed is:

1. An electrode comprising:
   synthetically produced, electrically conductive, doped diamond particles embedded in a carrier layer formed of electrically non-conductive material, wherein:
   the diamond particles protrude on both sides of the carrier layer;
   at least 90% of the diamond particles in the electrode have grain sizes within a 50 micrometer (µm) window;
   the 50 µm window is within a grain size range of 170 µm to 420 µm;
   at most 10% of the diamond particles have a grain size outside the 50 µm window; and
   at least some of the diamond particles have a grain size outside the 50 µm window.

2. The electrode according to claim 1, wherein the 50 µm window comprises 40 µm window.

3. The electrode according to claim 2, wherein the ratio of the thickness of the carrier layer to the average grain size of the diamond particles is 1:3 to 1:8.

4. The electrode according to claim 3, wherein, on both sides of the carrier layer, the proportion of free surface not occupied by diamond particles is at most 50%.

5. The electrode according to claim 3, further comprising at least one support layer.

6. The electrode according to claim 1, wherein the 50 µm window comprises a 30 µm window.

7. The electrode according to claim 6, wherein the ratio of the thickness of the carrier layer to the average grain size of the diamond particles is 1:3 to 1:8.

8. The electrode according to claim 7, wherein, on both sides of the carrier layer, the proportion of free surface not occupied by diamond particles is at most 50%.

9. The electrode according to claim 7, further comprising at least one support layer.

10. The electrode according to claim 1, wherein at most 5% of the diamond particles have a grain size outside the 50 µm window.

11. The electrode according to claim 1, wherein the ratio of the thickness of the carrier layer to the average grain size of the diamond particles is 1:3 to 1:8.

12. The electrode according to claim 11, wherein, on both sides of the carrier layer, the proportion of free surface not occupied by diamond particles is at most 50%.

13. The electrode according to claim 12, further comprising at least one support layer.

14. The electrode according to claim 11, further comprising at least one support layer.

15. The electrode according to claim 1, wherein, on both sides of the carrier layer, the proportion of free surface not occupied by diamond particles is at most 50%.

16. The electrode according to claim 15, further comprising at least one support layer.

17. The electrode according to claim 1, further comprising at least one support layer.

* * * * *